(No Model.)

J. L. HUBER.
SECONDARY BATTERY.

No. 399,535. Patented Mar. 12, 1889.

Witnesses.
J. Thomas Lottimer
Walter Scott

Inventor.
Joseph Leopold Huber.
By Paine & Ladd,
attys

UNITED STATES PATENT OFFICE.

JOSEPH LEOPOLD HUBER, OF HAMBURG, GERMANY.

SECONDARY BATTERY.

SPECIFICATION forming part of Letters Patent No. 399,535, dated March 12, 1889.

Application filed January 12, 1889. Serial No. 296,191. (No model.) Patented in France October 8, 1888, No. 193,387.

*To all whom it may concern:*

Be it known that I, JOSEPH LEOPOLD HUBER, a subject of the Emperor of Germany, residing at Hamburg, in the German Empire, have invented certain new and useful Improvements in Secondary Batteries, (for which I have obtained Letters Patent in France, No. 193,387, dated October 8, 1888,) of which the following is a specification.

This invention relates to improvements in polarization or secondary electric batteries; and the object of the same is to construct the electrodes in such a manner as to increase the effect, capacity, and durability of the secondary batteries. I attain this object by embedding into the active mass for the storage of the electricity—such as metallic compounds or substances—conductors of electricity in the form of a grating or screen in such a manner that the active mass will form a layer all around the single bars or rods, constituting the meshy or reticulated conductors, and the finished electrode will maintain the form of a net-work or sieve.

Figure 1:
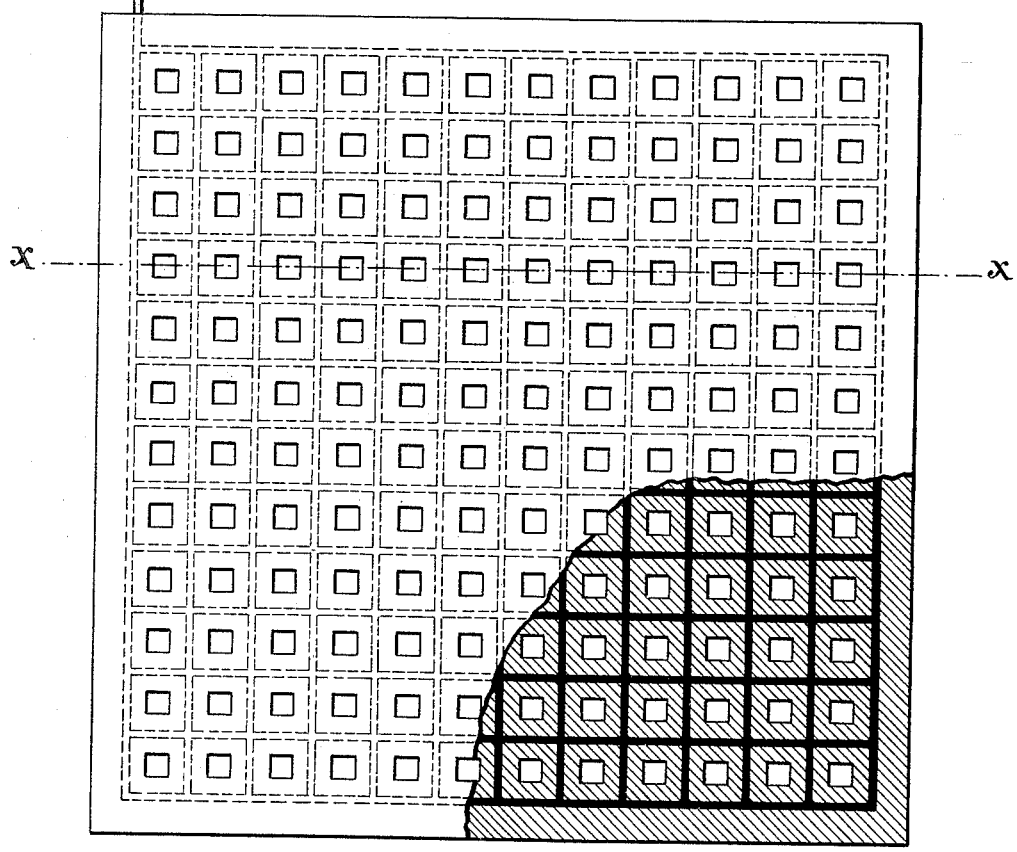
Figure 2:

From the accompanying drawings, in which Figure 1 is an elevation, partly in section, of my improved electrode for secondary batteries, and Fig. 2 a horizontal section of Fig. 1 after the line $x\ x$, it will be clearly understood that these perforations are in the active mass, in contradistinction to such well-known electrodes in which the perforations of the leaden support serve to receive the active mass, and the remaining perforations are adapted to permit an expansion of the active material, so that while in these latter electrodes the surface of contact between the active material and the electrolyte is diminished, on the contrary in the electrodes constructed according to my invention this surface is considerably enlarged, and thus a much greater effect obtained.

In order to embed the conductors of electricity having the form of a net-work, so as to cover the single bars of the same with the active material, these conductors are placed upon a plate or other molding-board provided with a certain number of pins of a smaller size than that of the meshes of the conductor and corresponding with their pitch, so as to just fit to the middle of the meshes. The space remaining between the bars of the net-work of the conductor and the pins of the molding-board is then filled up with the active material, either by means of kneading or mixing machines or by pressing, rolling, or otherwise molding by hand. After the said pins of the molding-board are withdrawn or the electrode taken off from the latter, the active mass of the electrode will be provided with the desired perforations, which allow the electrolyte to pass through the active mass of the electrode, the surface of contact of which, and consequently its effect, is thereby essentially increased.

Instead of perforating the electrodes in the manner heretofore described, this may be effected also by filling up the meshes of the conductors, first, with the active mass, and thereafter perforating the latter by boring or punching, or by any other means; or, instead of holes passing through the active mass only, recesses on one or both sides of the electrode may be employed to enlarge the surface of contact between the latter and the electrolyte and to obtain greater effect and capacity of the secondary battery.

Having fully described my invention, what I desire to claim and secure by Letters Patent is—

1. In a secondary electric battery, an electrode having the conductor or conductors of electricity in the form of net-work, grating, or screen embedded in the active mass for the storage of electricity, which mass is provided with perforations or impressions corresponding with the meshes or holes of the conductor, substantially as and for the purpose specified.

2. As an improvement in secondary batteries, an electrode consisting of a conductor or conductors in the form of net-work, grating, or screen covered with the active mass, which has formed therein perforations or impressions, substantially as and for the purpose described.

3. An electrode for secondary batteries, comprising a conductor within the active mass, which mass is provided with perforations or impressions, substantially as and for the purpose set forth.

4. As a new article of manufacture, an electrode for secondary batteries, consisting of a conductor or conductors in the form of network, grating, or perforated plate, serving as a support for the active mass, which is provided with perforations or impressions for the passage of the battery-fluid, substantially as specified.

In testimony that I claim the foregoing as my invention I have signed my name in presence of two witnesses.

JOSEPH LEOPOLD HUBER.

Witnesses:
 ALEXANDER SPECHT,
 DIEDRICH PETERSEN.